United States Patent [19]

Matsumoto

[11] Patent Number: 5,099,511
[45] Date of Patent: Mar. 24, 1992

[54] EXCHANGE SYSTEM FOR INCOMING CALLS FROM DIRECT-IN LINES

[75] Inventor: Masaharu Matsumoto, Kawasaki, Japan

[73] Assignee: Fujitsu Limited, Kawasaki, Japan

[21] Appl. No.: 448,840

[22] Filed: Dec. 12, 1989

[30] Foreign Application Priority Data

Dec. 12, 1988 [JP] Japan .................... 63-312008

[51] Int. Cl.[5] ............... H04M 3/38; H04M 7/14; H04Q 3/70
[52] U.S. Cl. .................. 379/198; 379/233; 379/244
[58] Field of Search ........... 379/244, 198, 196, 233, 379/142

[56] References Cited

U.S. PATENT DOCUMENTS 4,757,529 7/1988 Glapa et al. ............... 379/244

Primary Examiner—Thomas W. Brown
Attorney, Agent, or Firm—Staas & Halsey

[57] ABSTRACT

A private branch exchange for controlling the calls terminated from a direct-in line receives a call set-up message containing termination information including termination address information and termination subaddress information. The termination subaddress information is supplied by the originating station and includes a security code and an internal station number. A dial signal deciding part converts the security code into a class-of-service number in accordance with a security code table containing to class-of-service numbers. The services of the private branch exchange which are offered to a subscriber, for example termination to station or origination of call, are determined by indexing a class-of-service table containing class-of-service information using the class-of-service number.

15 Claims, 8 Drawing Sheets

EXCHANGE SYSTEM FOR INCOMING CALLS FROM DIRECT-IN LINES

BACKGROUND OF THE INVENTION

1. Field of the Invention

The present invention relates to an exchange system and, more particularly, to controlling the termination process for incoming calls to an exchange system from a direct-in line.

2. Description of the Related Art

A call terminated at a private branch exchange (PBX) from a public telephone network is generally connected to the attendant console and is then extended to an internal station or a private line (WATS/Tie Lines and so on). Meanwhile, an office exchange connected to the public network is connected, in some cases, to the private branch exchange through direct-in lines in place of ordinary lines. An incoming call from the direct-in line can be directly connected to the internal station, private lines for connecting other PBXs or external lines for transmitting calls to a central office.

The services for processing such incoming calls are generally referred to as DISA (Direct Inward System Access) service or DID (Direct Inward Dialing) service. Hereinafter, a call to receive such services will be referred to as a DID call.

The PBX service handles incoming calls in accordance with a class-of-service by assigning a class-of-service to DID trunk circuits provided as an interface for the direct-in line. Therefore, the PBX services provided for DID calls are preassigned for DID calls in accordance with the class-of-service assigned to the DID trunk circuit.

State of the art PBX circuits determine the destination of a call by receiving a dial signal number from the telephone office. In recent years, with development of the Integrated Service Digital Network (ISDN), when a call is terminated by the ISDN line from the ISDN terminal connected to the telephone office as it is received in the form of a message, the destination of the call is determined depending on termination address information inserted in the message. For the termination of calls from the ISDN line, the termination numbers, for example, can be assigned to the call set-up or related message.

Figure 1:
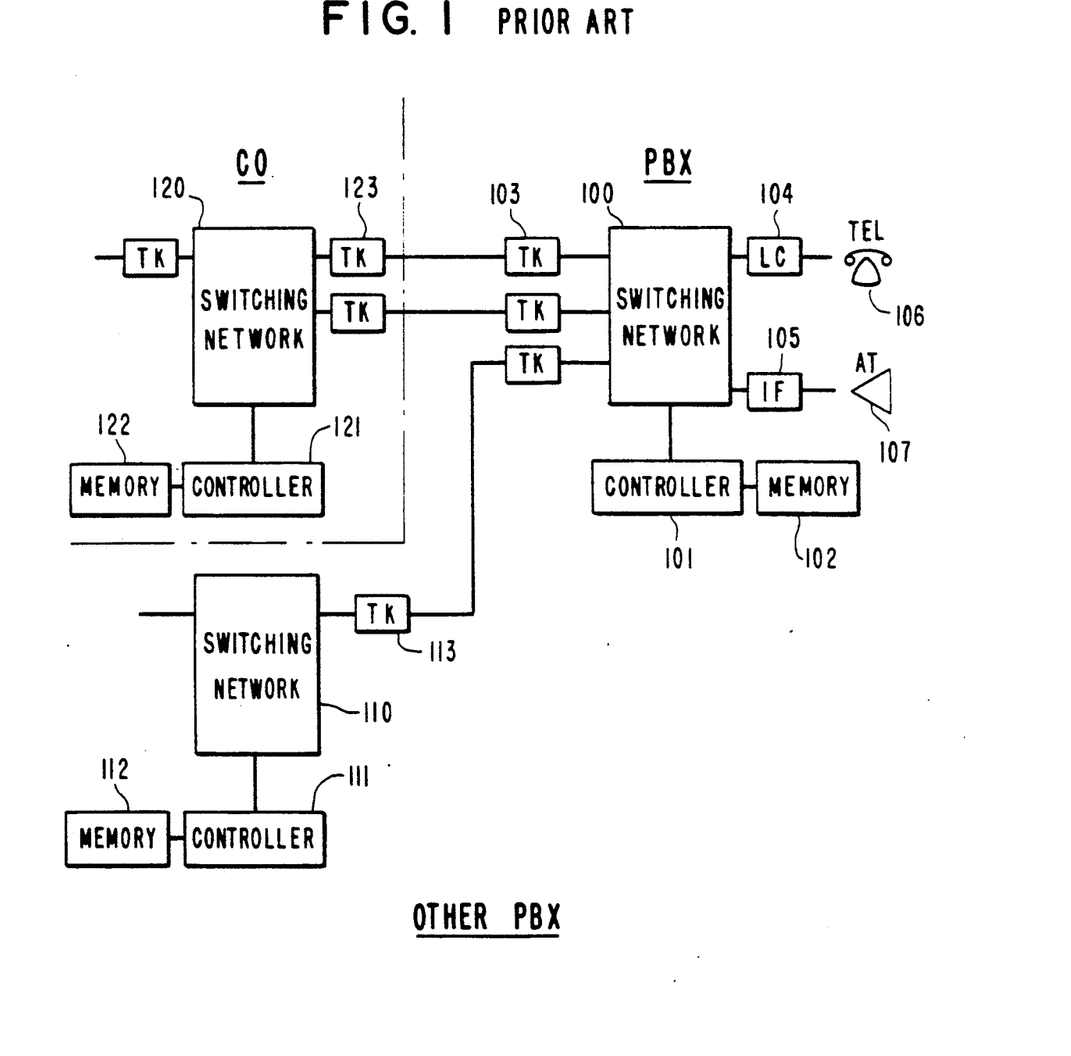
FIG. 1 is a block diagram illustrating connections between a public telephone network and private branch exchanges (PBXs) as background art for the present invention.

FIG. 1 shows connections between a public telephone network and a PBX as background for the present invention. The PBX comprises a switching network 100, a controller 101 for controlling the switching network 100, a memory 102, telephone sets (TEL) 106 connected to the switching network 100 through a line circuit (LC) 104, an attendant console (AT) 107 connected to the switching network through an interface circuit (IF) 105, and trunks (TK) 103 connected to the public network (office line) or private lines (WATS/Tie Line and so on) connected to other PBXs. The other PBXs and the central office exchange (CO) basically have structure similar to the PBX and comprise networks 110, 120, controllers 111, 121, memories 112, 122 and trunks 113, 123 as an interface with the public and private lines.

Figure 2A:
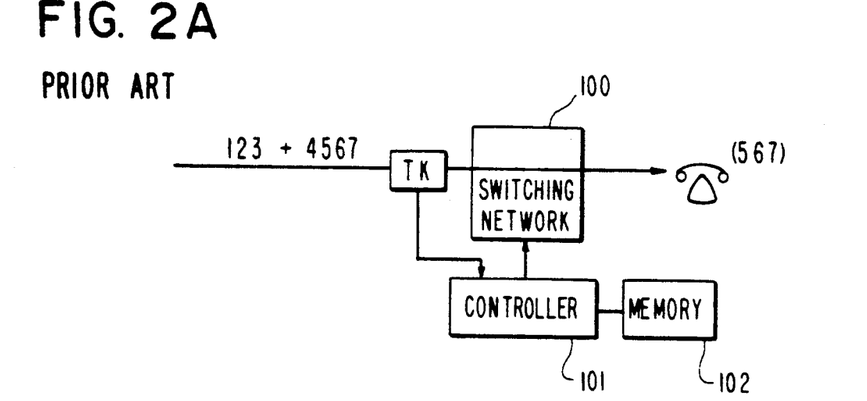
FIGS. 2A, 2B and 2C are diagrams showing formats of received information offered as a DID service.
Figure 2B:
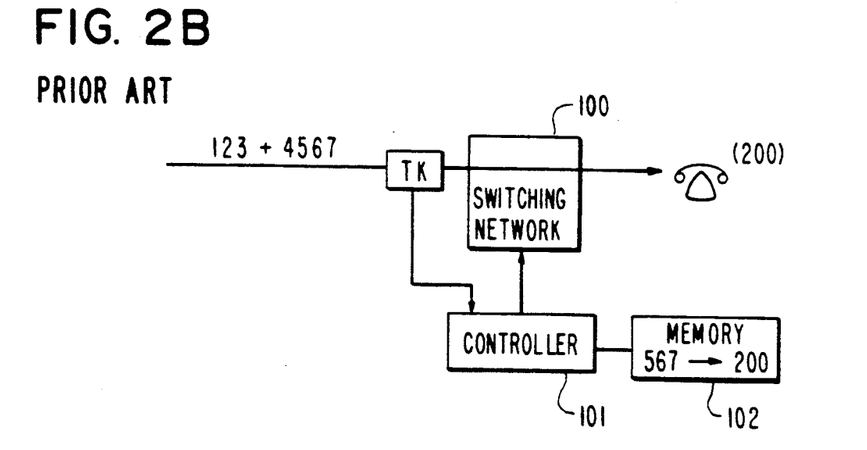
Figure 2C:
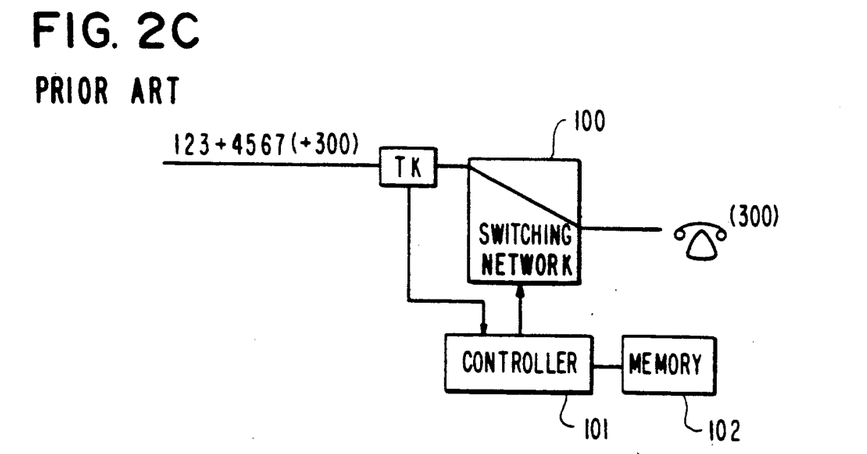

With the structure described above, the Direct Inward Dialing (DID) service has patterns of termination shown in FIG. 2A, FIG. 2B and FIG. 2C. FIG. 2A shows an example in which the lower digits of a line number to which a call is terminated from the office line correspond to a fixed number of an internal station. As an example, if the direct-in line number is "123-4567", the controller 101 receives the lower digits 567 from the central office line through the trunk TK and terminates the call at the internal station identified as the destination by these digits. Termination of this type is possible because the terminal address provided in the direct-in line number.

FIG. 2B shows a pattern of termination in which when the lower digits 567 of the call terminated from the direct-in line are received, the digits are converted variably to the extension 200 using a conversion table stored in memory 102. Thus, the converted signal is terminated to the extension telephone set as its destination.

FIG. 2C shows an example of termination to an extension in accordance with an additional code. For example, by receiving an additional code number 300, unlike the above two examples where the code sent from the central office exchange is used or converted, the extension can be identified using additional digits sent with the termination address information. The present invention refers particularly to the direct-in line dialing (DID) function for determining the destination of termination by receiving such an additional code.

Figure 3:
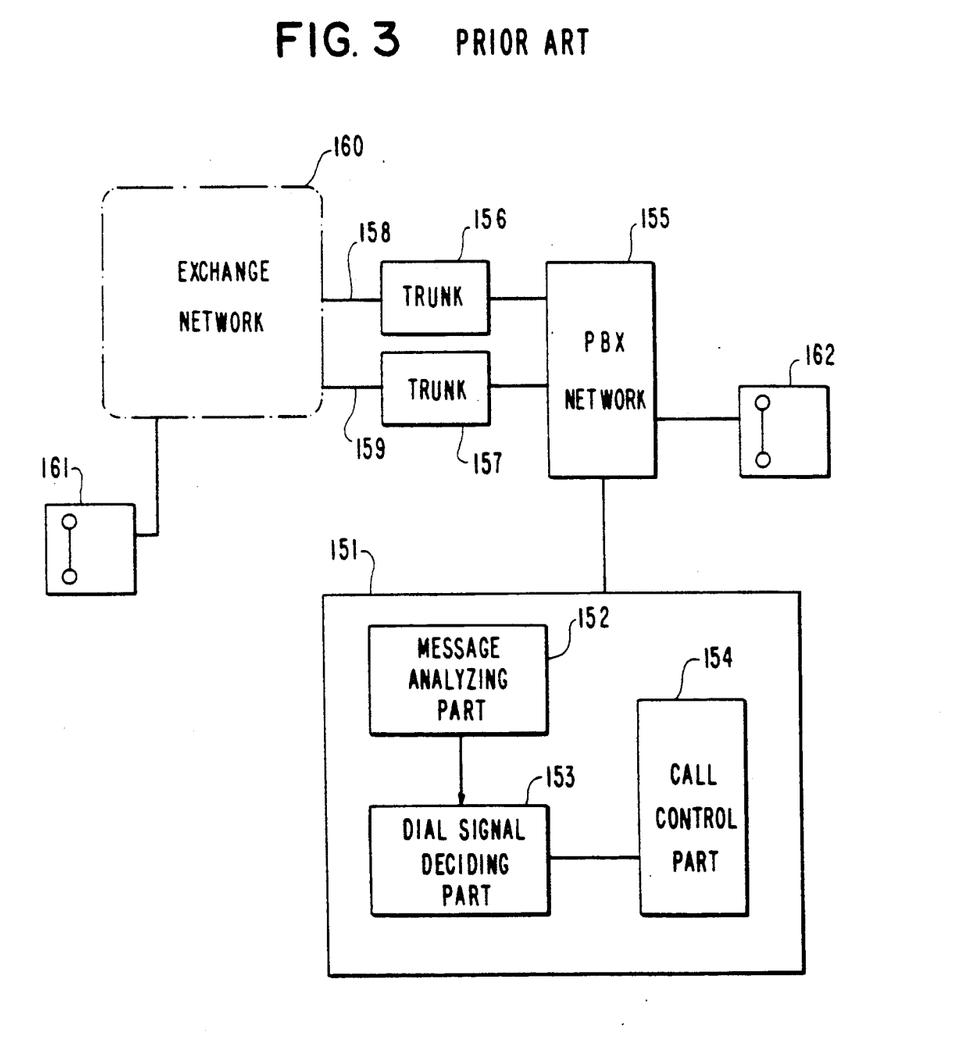
FIG. 3 is a block diagram of the prior art.

FIG. 3 shows a diagram for explaining a structure of a PBX system having the direct-in line function of the prior art. The following explanation is based on an example of the ISDN system.

The reference numeral 151 designates a controller of private branch exchange; 152 designates a message analyzing part for analyzing messages such as a call set up message or a PBX release request message; 153 designates a dial digits deciding part for deciding dial digits in the message; 154 designates a call controller for controlling call set up; 155 designates a PBX network; 156, 157 designate trunks, 158, 159 designate ISDN office lines; 160 designates an exchange network including an ISDN exchange; and 161, 162 designate ISDN terminal equipment.

The switching network 160 accommodates the other PBXs not illustrated (such as the other PBX shown in FIG. 1) and ISDN terminal units and the extension lines of PBX network 155 accommodate various terminal units. For instance, the termination address in the call set-up message can be converted to the dial-in number for issuing a call to the ISDN terminal unit 162 from the ISDN terminal unit 161 using the dial-in function of the PBX system.

In FIG. 3, a call is terminated to a trunk 156 from the exchange network 160, for example, through the ISDN office line 158 and the call set-up message is transferred to the controller 151. The controller 151 of the PBX system analyzes the type of message received in the message analyzing part 152 and transfers the termination subaddress (ex: called party subaddress) to the dial digits deciding part 153 for deciding the dial-in number, etc. The result is sent to the call controller part 154 which calls the ISDN terminal unit 162 and controls the setting of a path to the ISDN terminal unit 161 on the call originating side, upon response from the ISDN terminal unit 162.

The PBX system described above is capable of providing a variety of services in addition to the dial-in service discussed above. For example, in the PBX system the service for originating a call to the office line from the external ISDN terminal unit 161 through the PBX network 155 is available. In this case charging for origination of the call to the office line is carried out for the PBX and charging for use of office line extended up to the PBX is carried out for the external ISDN terminal unit 161. Therefore, charges for long-distance communication by telephone can be shared among companies having PBXs installed.

Figure 4:
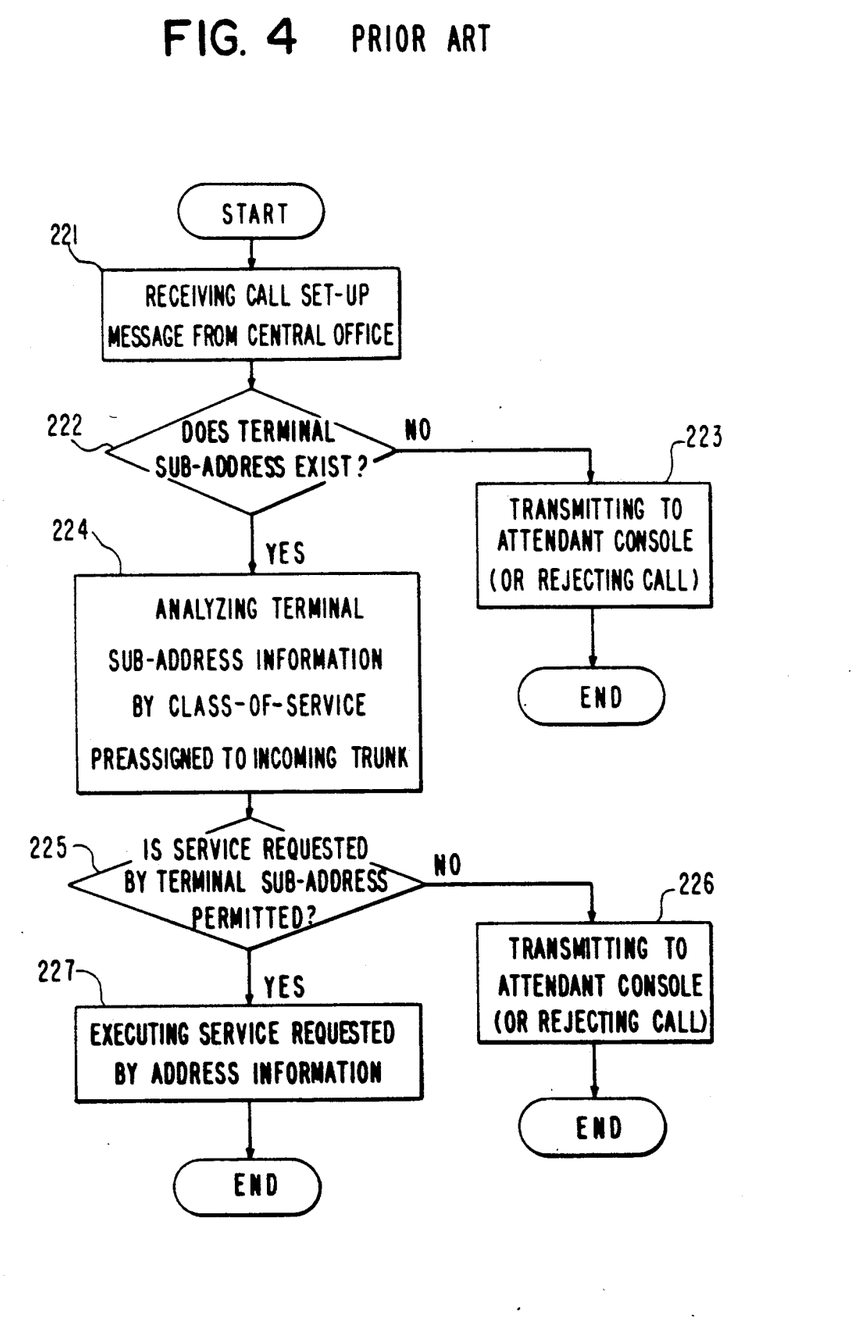
FIG. 4 is a control flowchart of the prior art of FIG. 3.

FIG. 4 shows a control flowchart of the prior art. In step 221, the call set-up message is received from the switching network 160. In step 222, the existence of a termination subaddress in the received call set-up message is decided. If the termination subaddress is not provided with the call (i.e., added thereto), then in step 223 the call is terminated to the attendant console or the termination of call is rejected. If the termination subaddress is provided, then in step 224 the termination subaddress is analyzed in accordance with the class-of-service restriction previously assigned to the incoming trunk to determine an internal station number.

When calls are terminated through the same ISDN line in the PBX of the prior art, the class-of-service (class restriction) available are forced to become equal thus losing the relationship to the type of external ISDN terminal unit. The system assigns class-of-service numbers to incoming trunks which are employed to provide the services such as origination of call to the office line. Accordingly, when a call is terminated to an incoming trunk having only the class-of-service allowing termination to the internal station (extension), then only the service of termination of call to the extension is offered. Therefore, as described above, the termination subaddress is analyzed depending on the class-of-service pre-assigned to a incoming trunk.

In step 225, it is determined whether a service, such as origination of call to the office line, is allowed or not. If the service is not allowed, then in step 226 the call is terminated to the attendant console or rejected. If, on the other hand, the service is allowed, then in step 227 the service such as origination of call to the office line designated by termination subaddress is offered.

As previously explained, since the PBX system having the dial-in service according to the prior art sets up the class-of-service available corresponding to incoming trunks, the number of trunks which can offer a particular service such as origination of call to the office line may be restricted. Thus, a problem of the prior art is that the application efficiency of incoming trunks is low.

Moreover, in a case where a call is terminated to the incoming trunk which allows the service such as origination of call to the office line from the ISDN line, every user can enjoy such service. Thus, the significance of providing service restrictions is lost. It is accordingly a problem of the prior art that the class-of-service cannot easily be changed.

SUMMARY OF THE INVENTION

It is therefore an object of the present invention to set up an exchange service for every call originator when DID calls are terminated from outside of a central office exchange.

It is also an object of the present invention to offer a DID service to a plurality of subscribers without increasing the number of lines.

It is further an object of the present invention to easily change service restrictions.

Therefore, according to the present invention, the class-of-service to be offered can be set for each originating subscriber of external ISDN terminal units having the dial-in function to easily restrict the services available.

These objects together with other objects and advantages which will be subsequently apparent, reside in the details of the construction and operation as more fully hereinafter described and claimed, reference being had the accompanying drawings forming a part hereof.

It is the first characteristic of the present invention that the PBX system includes a control unit for controlling calls terminated from the direct-in line. The control unit converts the additional information received from the direct-in line into the class-of-service information. The control unit includes a restriction table indicating allowable services corresponding to the class-of-service information. The restriction table is accessed using the class-of-service information as an index to obtain the allowable services.

It is the second characteristic of the present invention that the additional information is either second dial information received from the direct-in line or contained within a call set-up message received from the direct-in line.

It is the third characteristic of the present invention that the termination subaddress information is used as the additional information in the call set-up message.

It is the fourth characteristic of the present invention that the class-of-service information is classified into information to restrict the outgoing connection service (repeating connection) and information to restrict the station service.

It is the fifth characteristic of the present invention that a security code and address information are received at the same time as the additional information.

It is the sixth characteristic of the present invention that the information of a determined number of digits provided at the leading or ending part of the additional information is used as the security code and it is converted to the restriction class described above.

It is the seventh characteristic of the present invention that the security code and address information are individually received as the additional information.

It is the eighth characteristic of the present invention that the PBX network having the function to control the calls terminated from the direct-in line comprises a message analyzing part for analyzing messages sent from the ISDN office line as the direct-in line, a dial digit deciding part for deciding the dial digits and a call controller for controlling the network in accordance with the result of analysis in the message analyzing part and the result of decision in the dial digit deciding part, the PBX network having the dial-in function provides a table storing the security code and corresponding class-of-service, the ISDN terminal unit or a unit which is capable of accommodating the ISDN office line sends the termination subaddress in the call set-up message together with the security code added to the leading part thereof, and the PBX network, which receives the call set-up message through the ISDN line analyzes the call set-up message in the message analyzing part, identifies the security code added to the termination subaddress in the call set-up message with the dial digit deciding part, retrieves from the table a class-of-service restriction using the security code and offers the service in accordance with the class-of-service restrictions.

DESCRIPTION OF THE PREFERRED EMBODIMENTS

The preferred embodiments of the present invention are described in detail below with reference to the accompanying drawings.

Figure 5:
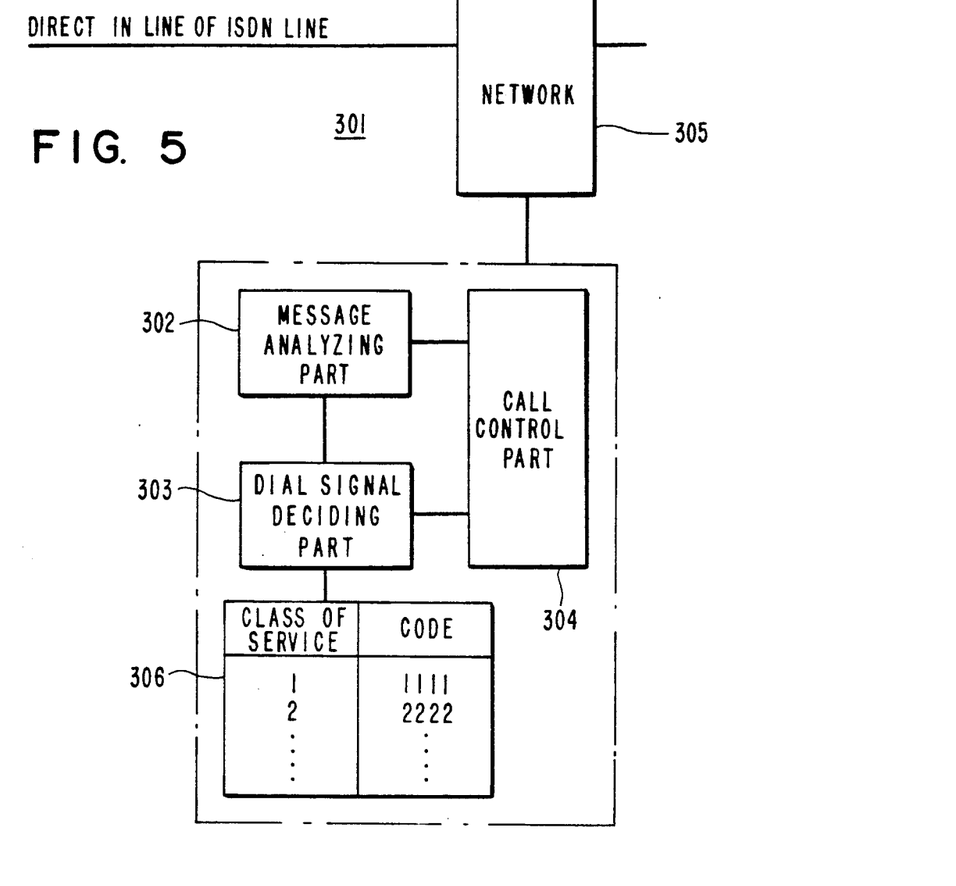
FIG. 5 is a block diagram for explaining the basic structure of the present invention.

The present invention adds, in the ISDN system, a security code corresponding to the class-of-service to the leading or ending portion of a termination subaddress and will be explained with reference to the basic structure diagram of FIG. 5. A private branch exchange (PBX) according to the present invention includes a message analyzing part 302 for analyzing messages sent from the ISDN line, a dial signal deciding part 303 for deciding dial digits of the message and a call controller part 304 for controlling network 305 in accordance with the information obtained from the message analyzing part 302 and dial signal deciding part 303. The PBX system 301 includes a dial-in function as well as a table 306 which stores class-of-service restrictions which correspond to the security codes.

The originating external ISDN terminal unit sends the termination address in the call set-up message with the addition of a security code at the leading part thereof. PBX system 301 receives the call set-up message through a ISDN line. The call set-up message is then analyzed in the message analyzing part 302. The dial signal deciding part 303 then determines the security code which was added to the leading end of the termination subaddress in the call set-up message. Once the dial signal deciding part 303 determines the security code, it retrieves from table 306 a class-of-service code, such as a number, using the security code. The dial signal deciding part 303 offers the system the service depending on the class-of-service code.

In the PBX system 301, the message received through the ISDN line is analyzed in the message analyzing part 302. For example, with a call set-up message, the existence of a termination subaddress is first determined. If the termination subaddress exists, the security code added to the leading or ending part thereof is identified in the dial signal deciding part 303. Once the security code is obtained the corresponding class-of-service code is retrieved from table 306 using the security code. The class-of-service code identifies which of the various PBX services are offered to the subscriber. That is, it identifies a restriction class of services which are available. The services which are available can then be varied for each originating subscriber through modification of the security code. When the class-of-service code or restriction class permits the service, such as termination to extension, then the designated service will be offered.

The above example has been explained regarding an ISDN system but the present invention can also be applied to an ordinary electronic exchange by replacing the message analyzing part with a receiving dial analyzing part.

Moreover, as described later, the present invention can also be applied to various services of PBX, in addition to the service for termination to the extension or internal station.

Figure 6A:
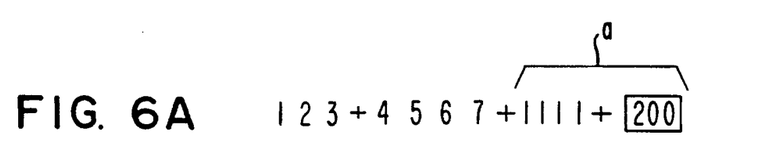
FIGS. 6A and 6B are diagrams respectively showing an example of the terminated information of the present invention.
Figure 6B:
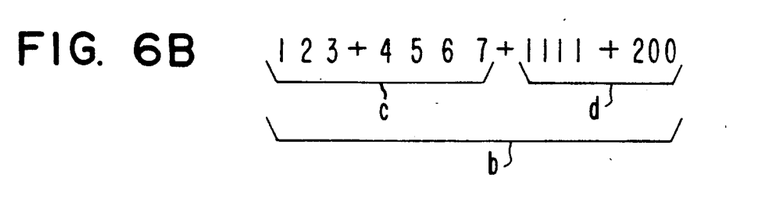

FIG. 6A and FIG. 6B show examples of terminated dial information received by the conventional electronic exchange system and ISDN exchange system, respectively.

In FIG. 6A, the direct inward dialing (DID) line number is 123-4567 and the termination address information 1111-200 is received successively thereafter as second dial information (a). The second dial information (a) includes a security code and an internal station number. For example, "1111" is the security code and "200" is the internal station or extension number.

In FIG. 6B, the DID line number includes the termination address information (c) 123-4567 and the termination subaddress information (d) 1111-200. These elements of the DID line number form the address information (b) in the call set-up message. In the termination subaddress information shown in FIG. 6B, "1111" is the security code and "200" is the internal station or extension number.

Figure 7:
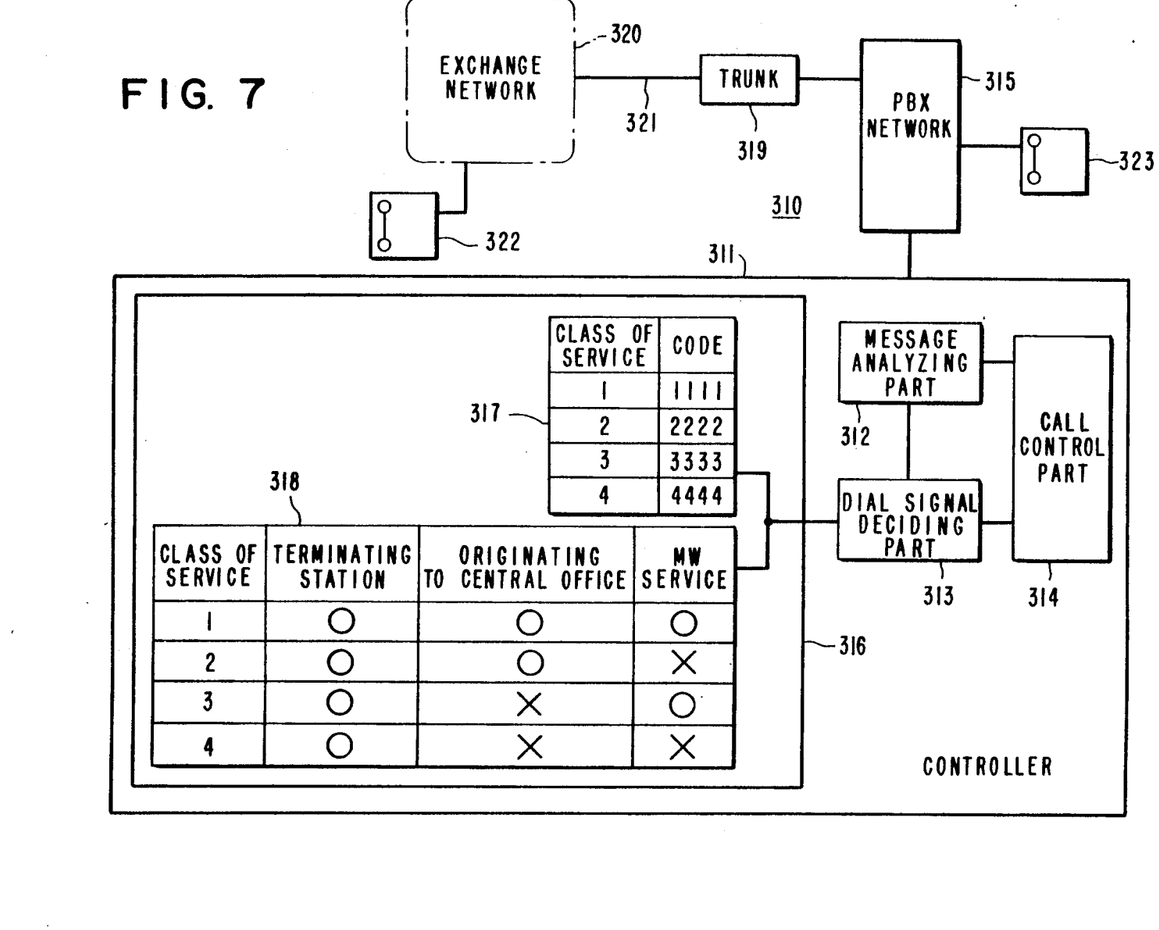
FIG. 7 is a block diagram of an embodiment of the present invention.

In FIG. 7, a practical structural block diagram of an embodiment of the present invention is illustrated. In FIG. 7, 310 designates a PBX system; 311 designates a controller; 312 designates a message analyzing part; 313 designates a dial signal deciding part; 314 designates a call controller; 315 designates a network; 316 designates a memory; 317 designates a security code table forming the table 306 shown in FIG. 5; 318 designates a class-of-service table; 319 designates a trunk; 320 designates an exchange network; 321 designates ISDN line; 322 designates an external ISDN terminal unit; and 323 designates an extension terminal unit (internal station).

In this case, the security code table 317 and class-of-service table 318 are formed in the memory 316. For example, in the security code table 317 four kinds of class-of-service (or restriction class) numbers 1~4 and corresponding four-digit security codes "1111"~"4444" are stored in the security code table 317. Meanwhile, the allowable services such as termination to station, origination to outgoing line and message waiting (NW) service are stored in the class-of-service table 318 corresponding to the class-of-service numbers 1~4. For example, in the case of a restriction class number of 1, all services are allowable, but in the case of restriction class number of 4, only the termination to extension service is allowable.

When a signal is issued from the external ISDN terminal unit 322 to receive the services offered by the PBX system 310, the security code is added to the leading part of the termination subaddress for transmission to the PBX System 310.

Figure 8:
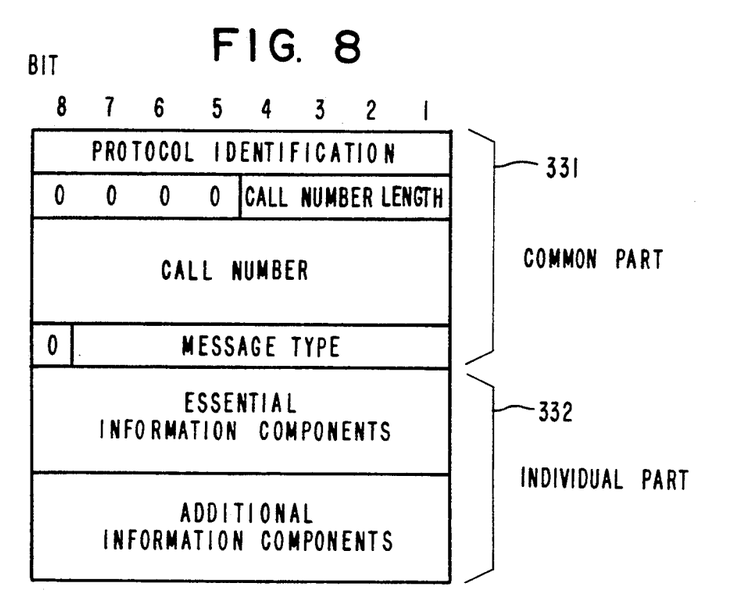
FIG. 8 is a diagram illustrating a message format.

FIG. 8 is a diagram for illustrating the format of a message. The message format consists of a common part 331 and an individual part 332. The common part 331 includes a protocol identifier, a call number length, a call number and a type of message. The individual part 332 includes an essential information element and an additional information element. The protocol identifier in the common part 331 is provided for identifying the call control and other protocols. The call number is assigned to the leading part of the call set-up message and while such call exists the call is identified by the call number. The type of message indicates a type of message, such as a call set-up message or a call disconnect message.

The address information (including, for example, the termination address and the termination subaddress) is inserted in the individual part 332. The essential information element and the additional information element include an information element identifier for indicating the type of information element, an information element length showing the length of information element, and an information element such as the address information.

In case the external ISDN terminal unit 322 issues a call containing address information to the extension terminal unit 323. The number, for example, "123-4567" of the address information for the PBX system 310 is considered the termination address (ex: called party address). The termination subaddress is formed by adding "2222", for example, as the security code to the leading part of the extension (or internal station) number "300" of terminal unit 323. The termination address and subaddress are set to the individual part 332 of the message. When the call is sent from the ISDN terminal unit 322, the exchange network 320 identifies "123-4567" as the termination address and transfers the call set-up message including the terminal subaddress to the PBX system 310 via ISDN line 321.

The PBX system 310 illustrated in FIG. 7 analyzes a message of the format shown in FIG. 8, received through the trunk 319 from the ISDN line 321, in the message analyzing part 312. Upon identification of the call set-up message in accordance with the message type, the existence of termination subaddress is determined. When the termination subaddress is detected, the dial signal deciding part 313 obtains the security code which is added to the leading or ending part of the message. The security code is then used to access the security code table 317 in order to identify the class-of-service code.

The dial signal deciding part 313 also identifies the service request from the termination subaddress. In accordance with the identified class-of-service code, the service request is compared with the entries of a class-of-service table 318, and the result is sent to the call controller 314. When the restriction class permits termination of call to an internal station, the extension terminal unit designated by the subaddress is called.

Figure 9:
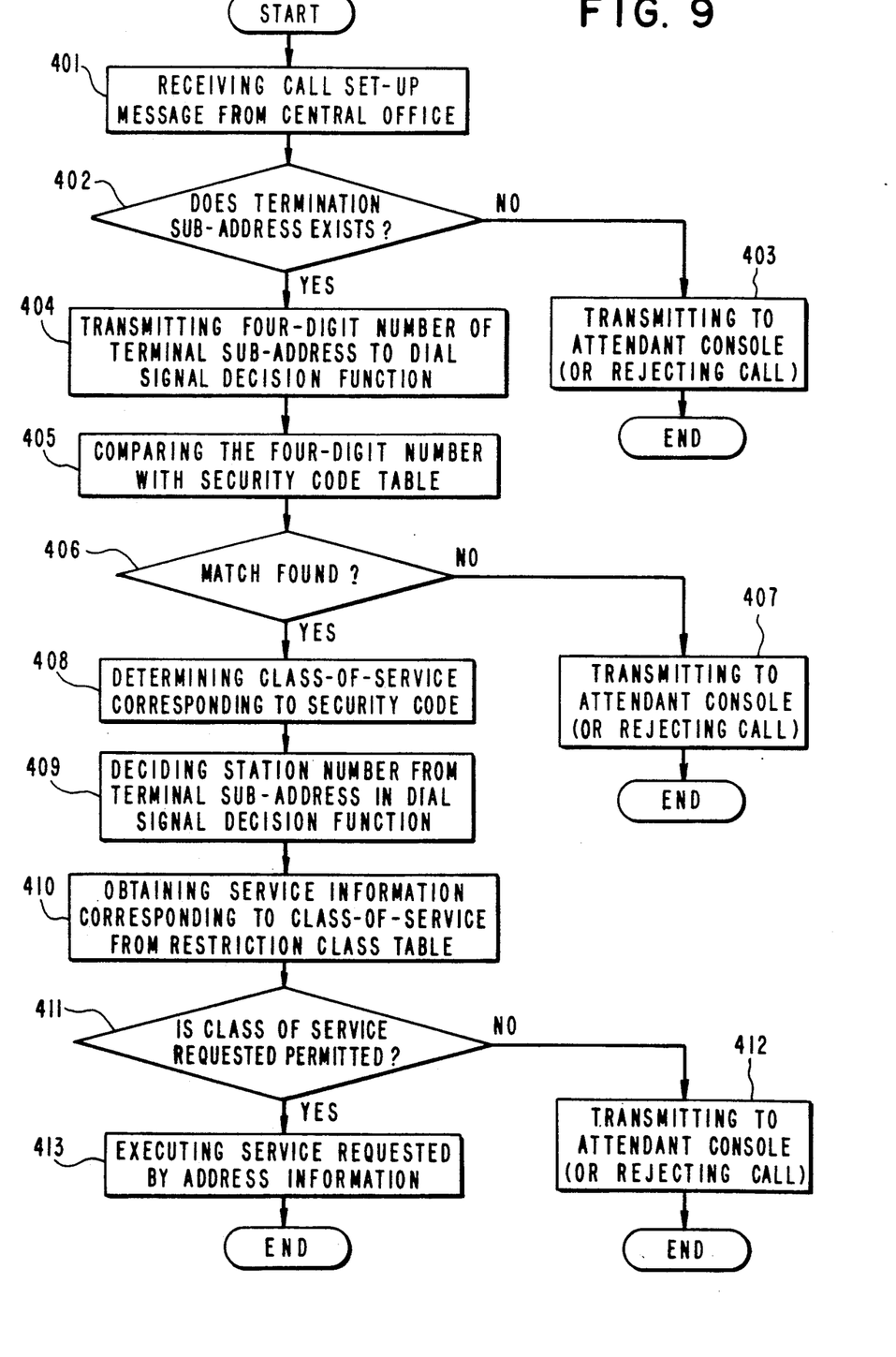
FIG. 9 is a control flowchart of the embodiment of the present invention shown in FIG. 8.

FIG. 9 is a control flowchart of the operation of the present invention illustrated in FIG. 7. In step 401, the controller 314 receives the call set-up message from the switching network 320. The existence of the termination subaddress in the call set-up message is determined in step 402. When it is determined that the termination subaddress does not exist, then in step 403 the call is terminated to the attendant console or the termination of call is rejected. On the other hand, when the termination subaddress exists, the security code of the termination subaddress is transferred to the dial signal deciding part 313 in step 404. In step 405, the dial signal deciding part 313 compares the security code with entries of the security code table 317. Namely, the security code added to the leading part of the termination subaddress is compared with the codes stored in the security code table 317 to obtain a match.

If no match is found in step 406, then an incorrect security code was added to the leading part of the termination subaddress or an access is made from an unknown external ISDN terminal unit to receive the service offered by the PBX system 310. Therefore, in step 407 the call is terminated to the attendant console or the termination of call is rejected.

On the other hand, if a match is found in step 406, then in step 408 the class-of-service corresponding to the security code in the security code table 317 is assigned as the restriction class of the incoming trunk. For example, when the security code added to the leading part of the termination subaddress is "2222", the corresponding restriction class number "2" is retrieved from the security code table 317.

In step 409, the dial signal deciding part 313 decides the internal station or extension from the termination subaddress excluding the leading security code. In steps 410 and 411, restriction class number is compared with the requested service, reference being had to the class-of-service table 318 to determine whether the service is allowable or not. If the service is found not allowable in step 411, the call is terminated in step 412 to the attendant console or the termination of call is rejected. If the service is found allowable in step 411, the service is offered for execution in step 413. For example, when the three digits "300" are decided after the four digit security code by the dial signal deciding part 313, then the three digits are determined to be the station number of the terminal unit 323. Moreover, since the restriction class number is "2", the class-of-service table 318 of FIG. 7 provides that the service of termination to extension can be offered to the subscriber. Hence, the call controller 314 calls the terminal unit 323.

In the case where the three digits indicate origination of the call to the office line, the call controller 314 controls origination of calls to the office line in accordance with the additional information element.

Figure 10:
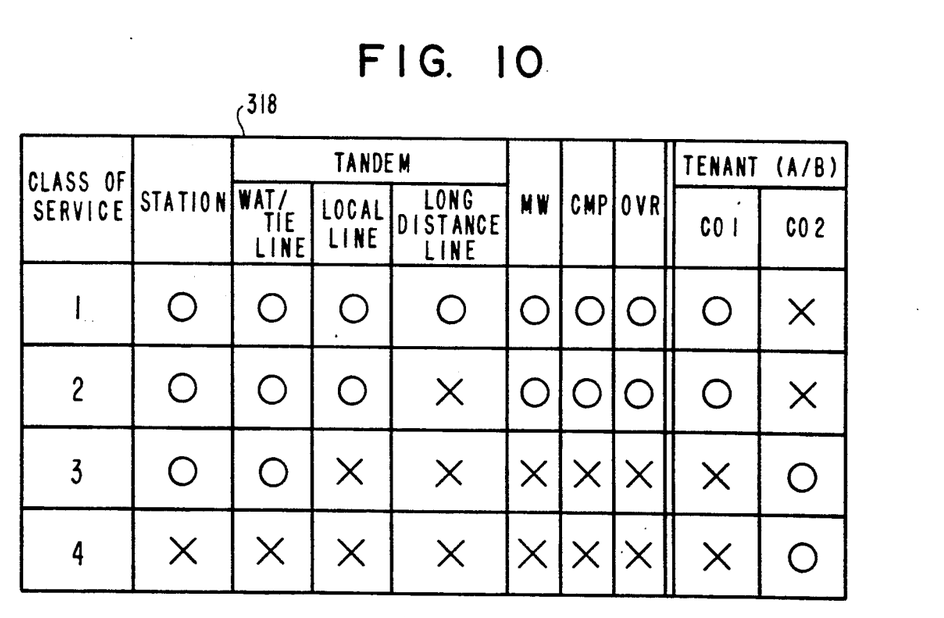
FIG. 10 is a diagram of a restriction table of the present invention.

FIG. 10 is a practical example of the class-of-service table 318 shown in FIG. 7. FIG. 10 illustrates the allowable or non-allowable services corresponding to the four restriction classes or classes-of-service. The column, "Station" indicates allowability of a termination of call to station. In case the termination to station is not allowable, termination is made to the attendant console. This column is used for deciding a type of termination of call.

The column, "Tandem" is decided by the outgoing connection code and this data decides respectively the allowability of repeating to the leased line, WATS, Tie lines and so on, allowability of repeating to the local exchange and allowability of repeating to the toll exchange or long distance call.

The column, "MW" indicates the allowability or a message waiting service. The column, "CMP" indicates the allowability of a camp-on service while the destination is busy. Namely, when the called station is busy, the BT is extended to the external subscriber and when the called station becomes idle, a call is terminated thereto by receiving the additional dial information (special number) or message during such busy period. The column, "OVR" indicates whether interruption is allowed during a busy period of the called station, if so a call can be terminated by interruption.

Moreover, control for each tenant can be effectively achieved with only one PBX by providing the column of "Tenant" in the class-of-service table 318. For example, the DID lines can be used separately for tenant A and tenant B, where only restriction classes 1 and 2 are allowed for the call originated to the office line 1 during the repeating, while the classes 3 and 4 are allowed for the call origination to the office line 2.

The class-of-service available can be varied using the security code sent from the originating station, thus the services available are no longer dependent on the fixed termination line.

As a matter of course, the number of the digits in the security code and the termination subaddress can be changed depending on the number of extension terminal units and on the number of class-of-services.

As described above, the present invention provides a table which stores the security codes and corresponding classes-of-service. The present invention extracts the restriction class from the class-of-service table 318 using the security code contained in the additional information (second dial information or termination subaddress information). Accordingly, the available services obtained from the class-of-service table 318 are offered only to the calling subscribers who know the security code, whereas the services are restricted to the other calling stations.

Thus, the present invention realizes the switching services for the PBX system by effectively utilizing the DID line and thereby improves flexibility of the available services.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What I claim is:

1. An exchange system for controlling an incoming call of an external terminal unit from a direct-in line, the incoming call including a requested service and termination subaddress information, the termination subaddress information including a code and a station identifier, said system comprising:
   switching network means for receiving the incoming call from the external terminal unit; and
   control means, operatively connected to said switching network means, for receiving the incoming call from said switching network means and for controlling execution of the requested service, said control means comprising:
   call analyzing means for receiving the termination subaddress information of the incoming call;
   decision means for identifying the code from the termination subaddress information and for determining if the requested service is allowable based on the code; and
   execution means for executing the requested service if said decision means determines that the requested service is allowable.

2. A system as recited in claim 1,
   wherein the code is a security code, and
   wherein said decision means comprises:
   a security code table for identifying a class-of-service number corresponding to the security code of the incoming call; and
   class-of-service means, operatively connected to said security code table, for identifying allowable services based on the class-of-service number.

3. A system as recited in claim 2, wherein the incoming call includes a call set-up message having a termination address and the termination subaddress information.

4. A system as recited in claim 2, wherein the requested service is a direct inward dialing service or direct inward system access service, and
   wherein the incoming call comprises a first dial number containing a termination address and a second dial number containing the termination subaddress information.

5. A system as recited in claim 2, wherein the direct-in line is an integrated service digital network line.

6. A private branch exchange for controlling an incoming call from a direct-in line, the incoming call including a requested service and termination subaddress information, the termination subaddress information including a security code and a station identifier, said private branch exchange comprising:
   call analyzing means for receiving the termination subaddress information of the incoming call;
   a security code table for identifying a class-of-service number corresponding to the security code of the incoming call;
   a class-of-service table, operatively connected to said security code table, for identifying allowable services based on the class-of-service number;
   decision means, operatively connected to said security code table and said class-of-service table, for identifying the security code from the termination subaddress information and for determining if the requested service is allowable based on the security code, said security code table and said class-of-service table; and
   execution means for executing the requested service if said decision means determines that the requested service is allowable.

7. A system as recited in claim 6, wherein the incoming call includes a call set-up message having a termination address and the termination subaddress information.

8. A system as recited in claim 6, wherein the requested service is a direct inward dialing service or direct inward system access service, and
   wherein the incoming call comprises a first dial number containing a termination address and a second dial number containing the termination subaddress information.

9. A method for terminating incoming calls from a direct-in line, comprising the steps of:
   (a) receiving a call set-up message having a requested service;
   (b) detecting when the call set-up message includes termination subaddress information having a code and a station number;
   (c) determining a class-of-service number based on the code; and
   (d) executing the requested service when the class-of-service number permits the requested service.

10. A method as recited in claim 9, wherein said method controls termination of incoming calls in an exchange system including a code conversion table having class-of-service numbers as entries, and wherein said determining in step (c) includes the steps of:
(c1) identifying the code from the termination subaddress information; and
(c2) obtaining the class-of-service number by accessing the code conversion table using the code.

11. A method as recited in claim 10, wherein the exchange system further includes a restriction class table containing information on permitted services, and wherein said determining in step (c) further includes the steps of:
(c3) identifying the permitted services by accessing the restriction class table using the class-of-service number; and
(c4) comparing the permitted services with the requested service.

12. A method as recited in claim 10, wherein the incoming call includes a call set-up message having a termination address, and the code is a security code.

13. A method as recited in claim 10, wherein the requested service is a direct inward dialing service or direct inward system access service.

14. A method as recited in claim 10, wherein the direct-in line is an integrated service digital network line.

15. A system as recited in claim 1, wherein the incoming call includes information on a termination address and the termination subaddress information.

* * * * *